March 8, 1960  W. CASTLES, JR  2,927,430
HYDRAULIC TRANSMISSION

Filed Oct. 5, 1955  4 Sheets-Sheet 1

INVENTOR.
WALTER CASTLES, JR.
BY
ATTORNEY

March 8, 1960  W. CASTLES, JR  2,927,430
HYDRAULIC TRANSMISSION
Filed Oct. 5, 1955  4 Sheets-Sheet 2
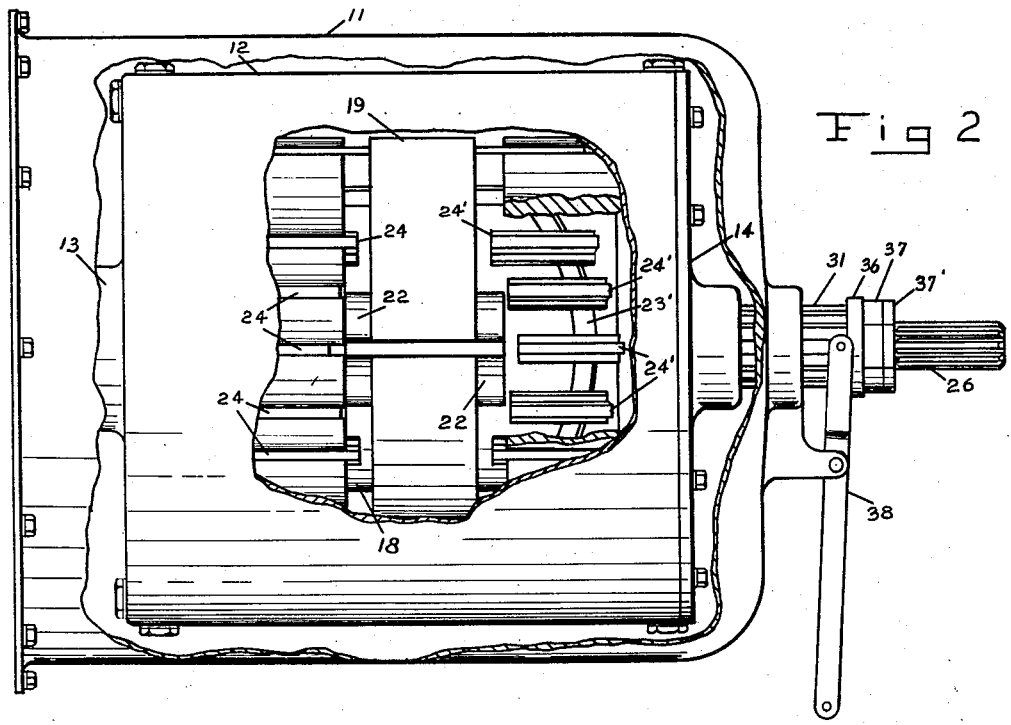
Fig 2
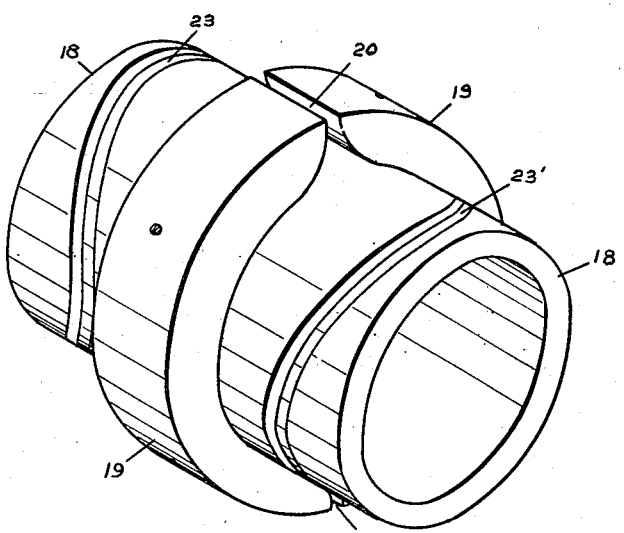
Fig 3
Fig 4
INVENTOR.
WALTER CASTLES, JR.
BY
ATTORNEY March 8, 1960 W. CASTLES, JR 2,927,430
HYDRAULIC TRANSMISSION
Filed Oct. 5, 1955 4 Sheets-Sheet 3
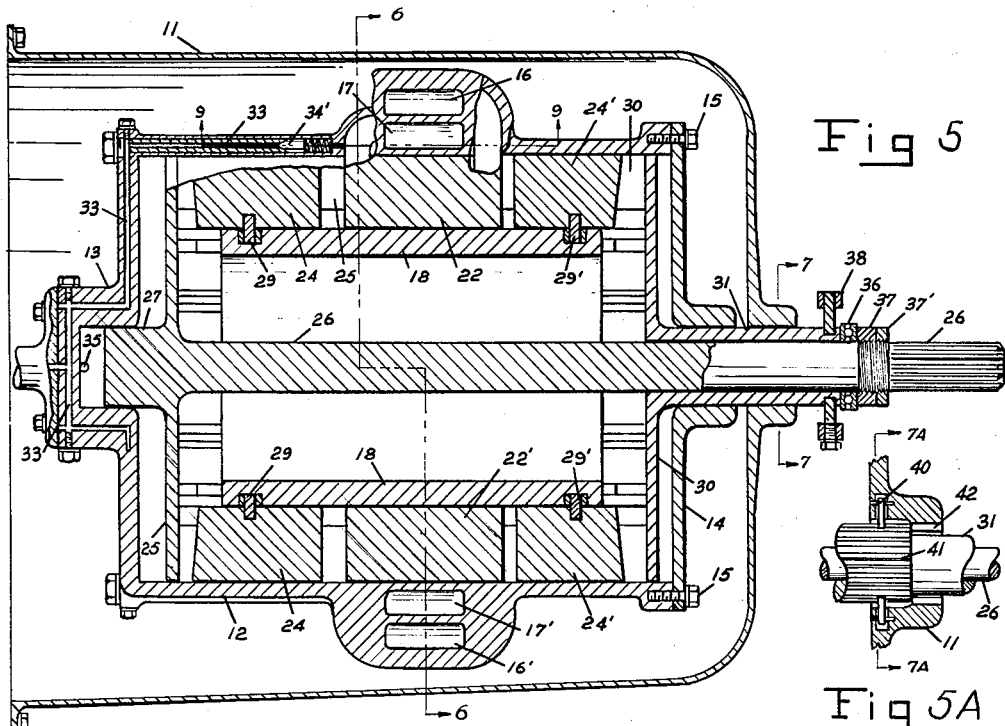
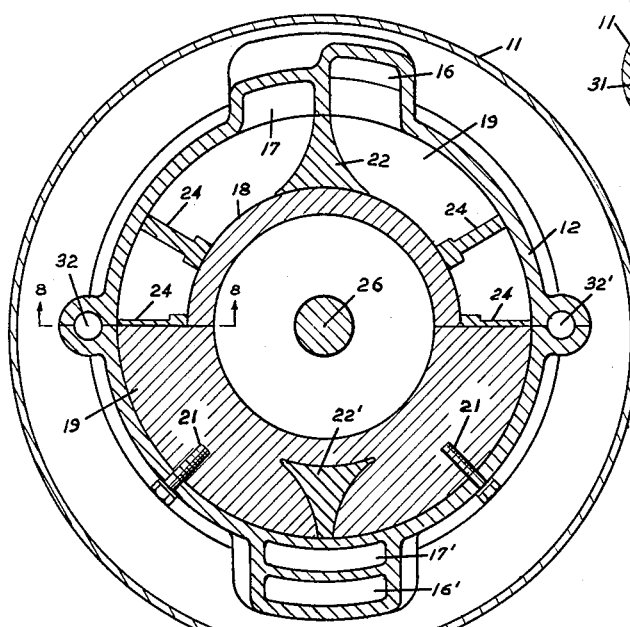
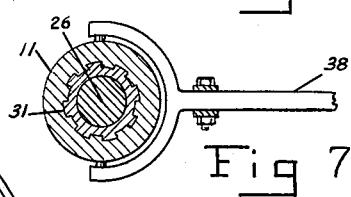
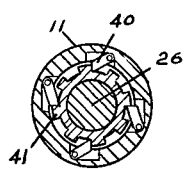
INVENTOR.
WALTER CASTLES, JR.
BY
ATTORNEY March 8, 1960   W. CASTLES, JR   2,927,430
HYDRAULIC TRANSMISSION
Filed Oct. 5, 1955   4 Sheets-Sheet 4

INVENTOR.
WALTER CASTLES, JR.
BY
ATTORNEY

United States Patent Office 2,927,430
Patented Mar. 8, 1960

2,927,430

HYDRAULIC TRANSMISSION

Walter Castles, Jr., Atlanta, Ga., assignor to Georgia Tech Research Institute, Atlanta, Ga., a corporation of Georgia Application October 5, 1955, Serial No. 538,733

10 Claims. (Cl. 60—53)

This invention relates to transmissions and more particularly to a hydraulic transmission.

In the past, many hydraulic transmissions have been made for automobiles, locomotives and other types of machinery requiring, when starting, high output torque and low output rotational speeds. Recently the trend in the automotive industry has been toward the use of hydraulic transmissions; however, in most of the prior art devices of this type, power losses due to slippage have reduced operating efficiency. Also, some hydraulic transmissions of the positive displacement type, of necessity, have restricted oil passages which cause a pressure drop and consequent loss of efficiency.

Briefly, my invention may be described as a rotary pump and motor hydraulic transmission unit of the axially slidable vane type wherein the input member or rotor is common to both the expansible chamber pump and the expansible chamber motor, the pump having a bladed rotationally fixed but axially movable reaction ring or member which coacts with the input rotor to form the pump chamber and the motor having a bladed driven or output rotor which coacts with the input rotor to form the motor chamber, the reaction ring and driven rotor being axially movable to simultaneously but inversely vary the capacity of the pump and motor chambers. Fluid passages connect the pump and motor chambers so that the contracting side of the pump chamber freely communicates with the expanding side of the motor chamber and the contracting side of the motor chamber freely communicates with the expanding side of the pump chamber.

It is an object, therefore, of my invention to provide a transmission which has high operating efficiency.

Another object of my invention is to provide a hydraulic transmission which has a positive drive through an infinitely variable ratio from one-to-one forward to any desirable ratio in reverse.

Another object of my invention is to provide a hydraulic transmission which has a dynamic brake.

Another object of my invention is to provide a hydraulic transmission which will vary the speed of the output shaft with respect to that of the input shaft in either the forward or reverse direction.

Another object of my invention is to provide a hydraulic transmission which is durable in construction and inexpensive to manufacture.

Another object of my invention is to provide a hydraulic transmission in which parts are quickly and easily replaced.

Another object of my invention is to provide a hydraulic transmission which is hydrostatically balanced so that the force required to shift it is negligible.

Another object of my invention is to provide a hydraulic transmission having few surfaces which are subject to wear.

Another object of my invention is to provide a hydraulic transmission which is easily adapted to standard automobile engines.

Another object of my invention is to provide a hydraulic transmission which requires no high pressure replenishing pump, and which may easily be adapted to be replenished by the oil system of a standard automobile engine.

Other and further objects and advantages of my invention will become apparent from the following description when taken in conjunction with the acompanying drawings wherein like characters of reference designate corresponding parts throughout the several views, and wherein:

Fig. 2 is a partially broken top view of the device shown in Fig. 1.

Fig. 3 is a perspective view of a detail showing the driving rotor of my invention.

Fig. 4 is a perspective view of a detail showing a driving vane of my invention.

Fig. 5 is a cross-sectional partially broken side view of the device shown in Fig. 1.

Fig. 5A is a cross-sectional view of a detail showing an optional arrangement.

Fig. 6 is a cross-sectional view taken along line 6—6 in Fig. 5.

Fig. 7 is a cross-sectional view taken along line 7—7 in Fig. 5.

Fig. 7A is a cross-sectional view taken along line 7A—7A in Fig. 5A.

Referring now in detail to the embodiment chosen for purpose of illustration, numeral 11 denotes the outer casing of a speed reducing hydraulic transmission constructed in accordance with the teachings of my invention. This transmission is adapted to be fixed to the casing of an automobile engine or other prime mover (not shown). It is to be remembered, however, that even though the drawings illustrate a transmission adapted as an automobile hydraulic transmission, my invention is in no way limited in its application to that field alone. On the contrary, my device is very versatile and may have wide application in the field of mechanical power transmission.

Figure 1:
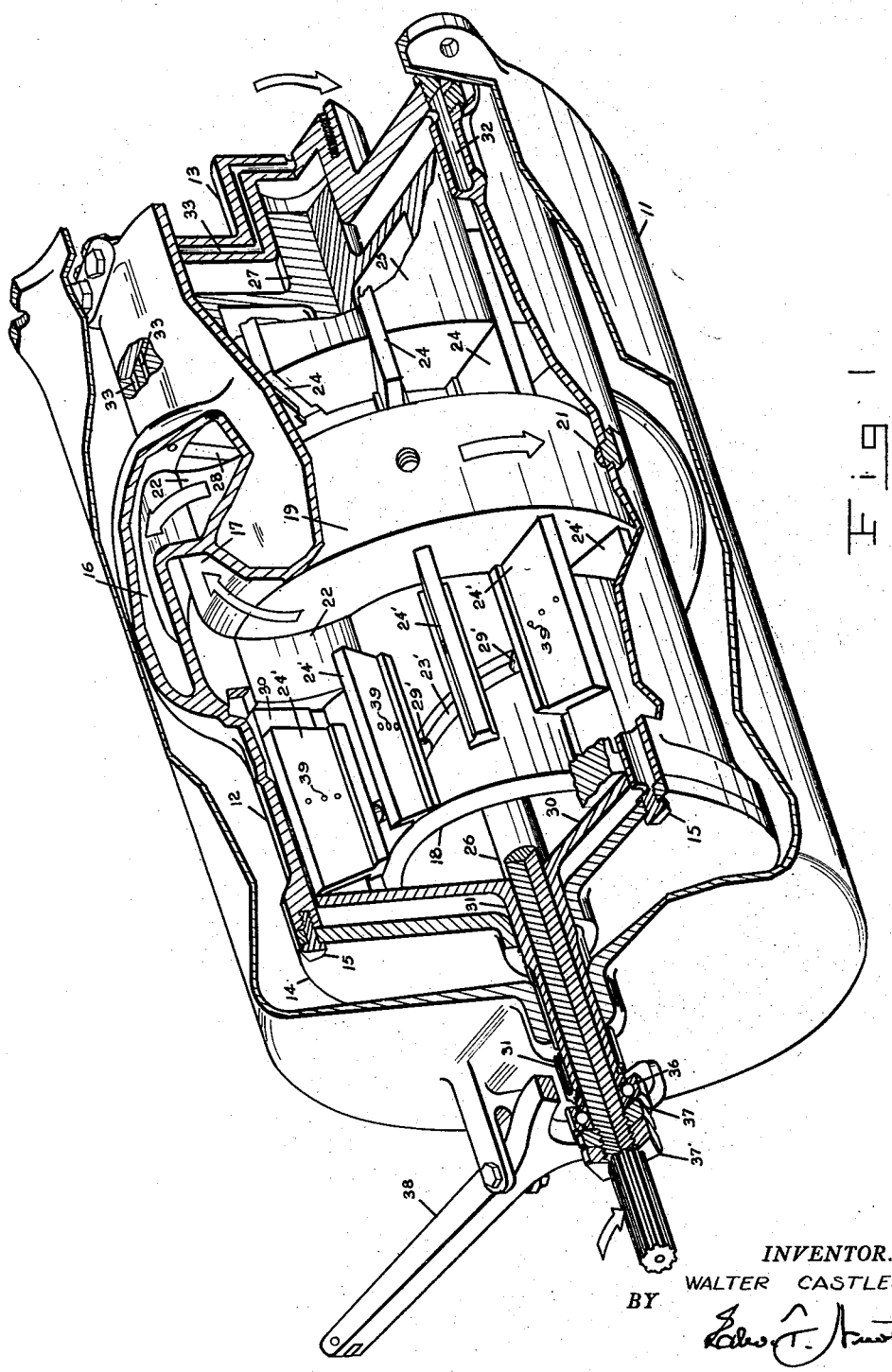
Fig. 1 is a partially broken perspective view of a hydraulic transmission constructed in accordance with my invention.
Figure 8:
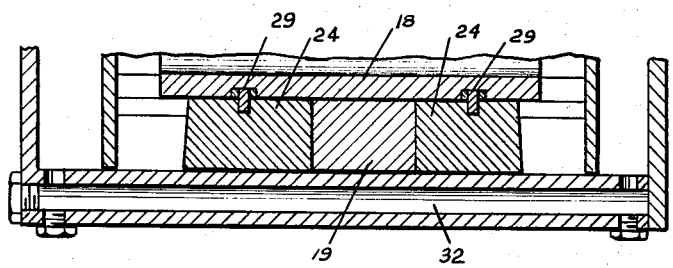
Fig. 8 is a cross-sectional view taken along line 8—8 in Fig. 6.

Outer casing 11 is an integral campanulate steel casing as shown in Figs. 1, 2 and 5. The lower portion of casing 11 forms a sump for any hydraulic fluid leaking out of the encased machinery and is tapered in the direction of the engine so that fluid is returned by gravity to the sump of the prime mover. As illustrated in Fig. 1, a second smaller campanulate or bell-like inner housing 12 is positioned within casing 11 for concentric rotation and is provided at its closed end portion with a projecting shaft 13 which is directly connected to the shaft of the prime mover (not shown). The opposite end of housing 12 is provided with a disc shaped cap 14 which is retained in place by bolts 15, and the remainder of the inside portion of the housing forms a perfect hollow cylinder. Two pairs of oil cross-over passages 16, 17 and 16', 17' are located 180 degrees apart, centrally within the outer periphery of housing 12; the function of these passages will be described in detail later.

Located concentrically within housnig 12 is the driving rotor shown in Fig. 3. This driving rotor is a machined integral member having a hollow cylindrical body 18 of substantially smaller diameter than the inside diameter of housing 12 and a peripheral flange 19 around the central portion of the outer periphery of body 18, thus forming a partition. Flange 19 has an outer diameter snugly fitted within the inside diameter of housing 12, and this flange is separated into two parts by grooves 20, 20' which are positioned 180 degrees from each other. Bolts 21 extend through housing 12 and engage the periphery of flange 19, thereby fixing the driving rotor assembly with respect to housing 11, substantially in the center thereof, and separating the respective entrance and exit of each oil cross-over passage. As seen in Fig. 3, groove 20 corresponds in shape to the sliding vane 22. Sliding vanes 22 and 22' are formed as shown in Fig. 4, the sides of which may be generated as involutes. These vanes are inserted respectively in grooves 20, 20', thus closing the passage formed by the grooves and extending therebeyond on either side. As illustrated in Fig. 1, the driving rotor assembly is so positioned within housing 12 that the oil cross-over passages are located immediately adjacent to grooves 20, 20', respectively; therefore, when oil flows through these passages, it travels from the front face of its adjacent vane on one side of annular flange 19 to the back face of the same vane on the other side of the flange.

Figure 10:
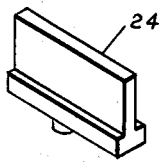
Fig. 10 is a perspective view of a blade of the device shown in Fig. 1.

In the outer periphery of cylindrical body 18 on both sides of annular flange 19 are identical cam slots 23, 23' which are cut in such a way as to impart simple harmonic motion between periods of dwell to spaced impeller or motor blades 24 and pump blades 24', illustrated in detail in Fig. 10. The function and operation of these impeller blades will be described in more detail hereinafter.

Figure 11:
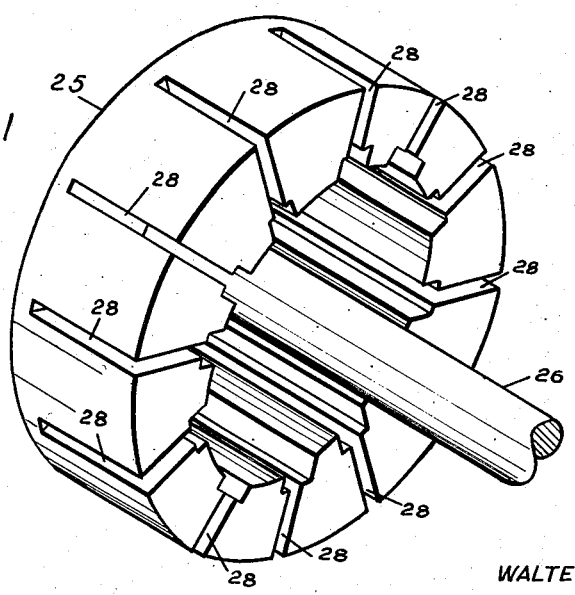
Fig. 11 is a perspective view of the driven rotor and shaft of the device shown in Fig. 1.

Prior to the installation of the driving rotor assembly, the driven rotor 25, illustrated in detail in Fig. 11, is installed for concentric rotation within housing 12. The outside diameter of rotor 25 is substantially the same as the inside diameter of housing 12, and the inside diameter of rotor 25 is substantially the same as the outside diameter of cylindrical body 18.

As seen in Figs. 1 and 5, driven rotor 25 is a cylinder which is closed at one end and provided with output shaft 26 and idle shaft 27 which respectively extend from the inner face and outer face of this closed portion to form an axis of rotation for driven rotor 25. Idle shaft 27 is journaled for both axial motion and rotation within a hollowed portion of shaft 13. Output shaft 26 is of smaller diameter than shaft 27 and extends through the hollow portion of cylindrical body 18, through cap 14 and outwardly from casing 11 to form an output shaft.

As seen in Fig. 11, driven rotor 25 is provided with spaced radial longitudinal slots 28 substantially identical in shape to the impeller blade illustrated in Fig. 10. From Fig. 5, it may be seen that motor blades 24 are respectively slidably retained within each of slots 28 and dowels 29 extend respectively from each of motor blades 24 to engage and ride in cam slot 23. Motor blades 24 are flat somewhat rectangular members having a flanged bottom portion which acts as a bearing surface against driven rotor 25. It will be apparent from the foregoing description, that when housing 12 rotates with respect to driven rotor 25, the face of driven rotor 25 always engages the end of sliding vanes 22 and 22'. Further, cam slot 23 is so arranged that motor blades 24 are withdrawn when they approach either of the sliding vanes and then are returned to engage the side of annular flange 19, thus providing a positive displacement pumping action.

Reaction ring or reaction annular member 30 is installed on the other side of flange 19 and is arranged in a manner similar to driven rotor 25; this annular member, however, is provided with a sleeve 31 extending outwardly from the outer face of the member in place of shafts 26 and 27. The remaining structure and arrangement is identical to driven rotor 25 and is provided with reaction or pump blades 24' retained in slots 28' and engaging cam slot 23'. Sleeve 31 is journaled on output shaft 26 and journaled within cap 14 so that it extends outward through cap 14 and is splined to casing 11 for longitudinal motion in relation thereto. The outside diameter of sleeve 31 is the same as the diameter of idle shaft 27 and oil channels 32 and 32' are drilled in inner housing 12 so that the same oil pressure acts against the faces of both driven rotor 25 and member 30, therefore providing equal and opposite fluid forces which act inward against the respective faces.

Figure 9:
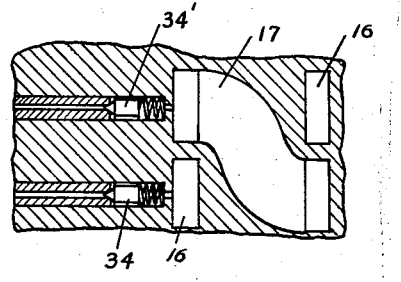
Fig. 9 is a cross-sectional view taken along line 9—9 in Fig. 5.

Several oil replenishing channels 33 are provided in inner housing 12 and they extend from the center of shaft 13 respectively to cross-over channels 16 and 17, and 16' and 17'. As seen in Fig. 9, channels 33 communicate with both cross-over channels 16 and 17 through check valves 34 and 34' respectively so that oil may be introduced into the inner housing on the low pressure side of the system. There is an identical arrangement for cross-over channels 16' and 17'. Oil hole 35 is provided through shaft 13 to provide a means for oil to leak past idle shaft 27 and into casing 11 without building up pressure behind shaft 27.

To compensate for the outward thrust of driven rotor 25 and member 30, ball bearing 36 is provided at the terminal end of sleeve 31 and is held in place by lock nuts 37 and 37' which threadably engage shaft 26 as illustrated in Fig. 1, Fig. 2 and Fig. 5. An operating lever 38 is pivotally mounted on casing 11 and connected to the splined end section of sleeve 31 to provide camming action therefor and thus shift both member 30 and driving rotor 25 with respect to flange 19.

In some instances, it may be advisable to limit the torque increases to a fixed value; I have therefore provided ports 39 which may be arranged as shown along the face of pump blades 24' to allow hydraulic fluid to pass through these ports where predetermined pressures are attained. By allowing fluid to pass through these ports, the fluid is by-passed from the high pressure side to the low pressure side of my system. It is obvious that these ports are optional and that they would function equally as well if placed between cross-over channels 16 and 17 or 16' and 17'.

A further variation of ports 39 is illustrated in Fig. 1. In this illustration, the ports are opened or closed by member 30, thus allowing positive drive when lever 38 is in the forward position and slippage of oil when lever 38 is in the neutral or reverse position. The obvious advantage of this arrangement in an automobile drive is that the restriction offered to the fluid flow by ports 39 will act as a dynamic brake when lever 38 is in the neutral position, thus retarding the rotation of output shaft 26. If no ports were provided, shaft 26 would lock each time lever 38 was placed in the neutral position.

In order to improve the efficiency of transmission in the forward direction, I have provided an optional arrangement whereby member 30 is allowed to rotate in housing 12 whenever lever 38 is in substantially the forward position. This may be accomplished by the use of a unidirectional clutch or free wheeling unit illustrated in Figs. 2A and 7A consisting of pawls 40 and splines 41 arranged as shown in place of the splines on sleeve 31, being so arranged that it will allow rotation of member 30 in the direction of rotation of the prime mover. This clutch automatically locks out, when splines 41 engage splines 42, to prevent "free wheeling," whenever lever 38 is moved into the reverse range. Thus when the annular face of the member 30 is moved against the adjacent face of flange 19 the volume of fluid circulation becomes zero, the member 30 would then be released and become free to rotate with the driving rotor and inner housing 12 at whatever speed was produced by internal friction. Since this speed would be only slightly less than that of the driving rotor, the reciprocating action of pump blades 24' would practically cease and all parts within housing 12 would be rotating at substantially the same speed, therefore eliminating practically all losses due to fluid motion caused by the reciprocation of blades 24' and thus produce a straight-through drive of maximum efficiency.

It is to be remembered that when lever 38 is in the forward position, or position in which shaft 26 will rotate in the direction of the prime mover, channels 16 and 16' are the high pressure passages and therefore the reaction of member 30 will be such as to tend to rotate it in a direction opposite the direction of rotation of the prime mover. Further, as the amount of oil being pumped approaches zero, the friction of flange 19 against member 30 will overcome the reaction torque and member 30 will rotate with the driving rotor.

*Operation*

It will be apparent from the foregoing description that cam slots 23 and 23' are of such shape as to impart simple harmonic motion to blades 24, 24' along their longitudinal axes whenever there is relative motion between member 30 and the driving rotor, or between the driving rotor (shown in Fig. 3) and driven rotor 25. This reciprocating motion is imparted at the rate of two cycles per revolution. The slots are further designed to permit a 30 degree dwell at each end of the longitudinal travel of the blades so that at any given time the ends of at least two blades, 180 degrees apart, are in contact with the adjacent edge of flange 19.

From an inspection of Fig. 1, it will be seen that the two driving vanes 22 and 22' act as longitudinal spacers for member 30 and driven rotor 25 so that this entire assembly is free to slide axially within inner housing 12. The accompanying drawings illustrate that this motion is accomplished by actuation of operating lever 38 which is independent of any rotation of the mechanism within casing 11. Proper clearance between the impeller blades and flange 19 is maintained by adjustments of lock nuts 37 and 37'. The space within housing 12 is kept entirely full of oil or other hydraulic fluid by means of oil channels 33 which may be connected to the oil pressure system of the prime mover through a hole in the center of its drive shaft (not shown). It should be noted that at all times channel 33 is in communication, through appropriate check valves, with the return or low pressure side of my device, thus providing continuous replacement of any oil which may leak out of housing 12. Any oil which leaks out of housing 12 will drain into the prime mover for reuse. It should be apparent that instead of the dry sump, as illustrated and described above, a proper reservoir could be incorporated within casing 11 with a replenishing pump associated therewith without departing from the scope of my invention.

Assuming now that shaft 13 is rotating in the direction indicated in Fig. 1; also, that lever arm 38 is in the neutral or center position; this would give a zero output to driving shaft 26 since member 30 and driven rotor 25 are equidistant from flange 19. In this position, the volume of the two annular spaces on either side of flange 19 are approximately equal. Inner housing 12 and the driving rotor consisting of body 18 and flange 19 would also be rotating, driving vanes 22 and 22' past pump blades 24' retained by member 30, therefore reacting against the oil therebetween. Due to the shape of cam slot 23', these blades are consecutively forced back into their respective slots 28' ahead of driving vanes 22 and 22', thus permitting them to pass without interference and still maintain an oil seal between member 30 and the end of vanes 22, 22' since member 30 is always in contact with driving vanes 22 and 22'. Similarly, there is always at least one fixed vane in contact with the side of flange 19. Since there is a 30 degree dwell in cam slot 23' each of pump blades 24' wipes along the side of flange 19 through an arc of 30 degrees before being withdrawn.

From the above it is seen that the hydraulic fluid contained between member 30 and flange 19 will be forced out ahead of driving vanes 22 and 22' and into passages 17 and 17'. Simultaneously, the reverse action takes place on the receding side of vanes 22 and 22' so that a void tends to be continuously created behind these vanes. Because of the symmetry, this void is exactly equal to the volume of fluid being forced through passages 17 and 17' and is constantly refilled by hydraulic fluid from passages 16 and 16'. The travel of hydraulic fluid is illustrated by the arrows in Fig. 1.

As has been described above, the construction of the driven side or the expandable chamber motor side is identical with that of the driving side or the expandable chamber pump side and the portion of vanes 22 and 22' on one side of the flange 19 is equal to the portion just described; therefore, with the same relative motion of motor blades 24, when vanes 22 and 22' pass, the same amount of oil would be displaced, thus pumping through channels 16 and 16' and replenishing the void by the fluid received from passages 17 and 17'. Thus, a continuous exchange of oil between the annular member or pump side and driven rotor or motor side is maintained and hence there is no rotation of the driven rotor.

When lever 38 is placed in the forward position by moving it in the direction away from the prime mover, the assembly consisting of member 30, vanes 22, 22' and driven rotor 25 is moved axially within rotating housing 12 in such a manner that the volume of the annular space of the pump chamber containing blades 24' is decreased while the volume of the annular space of the motor chamber containing the blades 24 is increased simultaneously by the same amount. Under these conditions, the rate of fluid displacement by blades 24' is decreased while the capacity of the space containing the blades 24 is increased so that less relative motion between driven rotor 25 and vanes 22 and 22' is required to accommodate the fluid circulated through channels 17, 17'. It is apparent, therefore, that driven rotor 25 and output shaft 26 are rotated slowly in the direction of rotation of housing 12.

As lever 38 is advanced more and more, the volume of oil displaced by pump blades 24' approaches zero, and when member 30 becomes contiguous with flange 19 substantially no oil is pumped through the crossover passages and therefore motor blades 24 must be driven at the same rate as vanes 22, 22', thus providing substantially a positive drive between shaft 13 and output shaft 26 since they would be hydraulically locked.

Conversely, when lever 38 is moved to the reverse position, the assembly consisting of member 30, vanes 22 and 22' and driven rotor 25 is moved axially within rotating housing 12 in such manner that the volume of the pump chamber is increased while the volume of the motor chamber is decreased by the same amount. Therefore, upon rotation of housing 12, rotating vanes 22 and 22' with respect to member 30, a large volume of oil is displaced and pumped through channels 17 and 17'. The volume of oil thus pumped is larger than is displaced by the pumping action of vanes 22 and 22' and blades 24; therefore, blades 24 would be displaced in the opposite direction from the direction of rotation of housing 12.

As lever 38 is moved further in the reverse direction, the rate of backward rotation of driven rotor 25 would increase proportionally and when the volume of the pump chamber is twice the volume of the motor chamber, the relative rotation between driven rotor 25 and housing 12 would be twice as great as the relative rotation between housing 12 and fixed rotor 30; thus resulting in reverse rotation of shaft 26 at the same rate as the forward rotation of the prime mover. It is apparent, therefore, that output shaft 26 may easily be made to rotate even faster in reverse and may thus serve as a speed increaser whose theoretical limit approaches infinity as the annular space containing pump blades 24' approaches zero.

It should be remembered that the volume of hydraulic fluid in which blades 24, 24' operate is constant regardless of the position of lever 38, and because this fluid is practically incompressible, the output shaft of my device will be positively driven in all ratios except neutral. It should further be remembered that the device I have disclosed will act as a transmission with very low friction losses and a resulting torque output of substantially equal torque of output of the prime mover.

As previously stated, the space within rotating housing 12 is kept completely full of hydraulic fluid, so that as the sliding assembly, consisting of member 30, driven rotor 25 and driving vanes 22 and 22', is moved axially by the action of lever 38, a certain amount of fluid must be displaced in order to permit this movement. This is accomplished by means of oil channels 32, 32' which permit oil to be transferred from one end of housing 12 to the other. It should be apparent that these oil passages could be altered to provide for hydraulic shifting of the sliding assembly by merely allowing passage 32 to go to one end of the sliding assembly and passage 32' to the other end. The sliding assembly could then be shifted by forcing hydraulic fluid through one or the other passage.

Although the transmission described herein is applicable to any situation requiring an infinitely variable speed drive, it is particularly suited to automotive applications, since it is relatively simple to manufacture in quantity production, has few moving parts, and can be made fully automatic by means of suitable linkage with the engine controls. Furthermore, it is capable of high efficiencies at 1:1 ratios in the forward direction (straight through drive), which makes any additional clutch unnecessary.

Since this is essentially a positive drive device the engine can, if necessary, be started by pushing the car at low speed, or, with the control in or near the neutral position, the car can be prevented from rolling in either direction while the engine is running at any speed.

As previously described, the dynamic braking action may be incorporated in order to prevent excessive loads on the driven shaft at high torque ratios from damaging either the driving mechanism or the transmission itself.

It will be obvious to those skilled in the art that many variations may be made in the embodiment chosen for illustration without departing from the scope of my invention as defined in the following claims.

I claim:

1. A hydraulic transmission for converting the speed of the output shaft of a prime mover both in the forward and reverse direction comprising, a hollow campanulate casing fixed to said prime mover, a hollow housing within said casing and fixed to said output shaft of said prime mover for rotation within said casing, a hollow cylindrical driving rotor of substantially smaller diameter than the inside diameter of said housing concentrically fixed within said housing for rotation therewith, an annular flange joining said housing to said driving rotor and partially partitioning said housing into a motor compartment and a pump compartment, a rotationally fixed reaction ring slideably axially within the pump compartment of said housing, said reaction ring being slideably attached to said casing for axial movement with respect thereto, a driven rotor slideably and rotatably positioned within the motor compartment of said housing, an output shaft fixed to said driven rotor and extending outwardly of said casing and said housing, said driven rotor and said reaction ring being axially fixed with respect to each other but relatively rotatable, said driving rotor being provided with a pair of spaced peripheral grooves separated by said annular flange, a plurality of pump blades slideably retained by said reaction ring, said pump blades having means which engage one of said grooves and radially extend between said driving rotor and said housing, a plurality of motor blades slideably retained by said driven rotor, said motor blades having means which engage the other of said grooves and extend radially between said driving rotor and said housing, a pair of driving vanes slideably extending through said annular flange and abutting said reaction ring and said driven rotor, said vanes extending radially between said driving rotor and said housing and diametrically opposed to each other, cross-over hydraulic fluid channels within said housing adjacent said vanes for passing oil from the face of said vanes on one side of said annular flange to the back of said vanes on the other side of said annular flange, said grooves in said driving rotor being so arranged as to cause said pump blades and said motor blades to wipe along respective sides of said annular flange and to pass around said vanes, means for controlling the axial positioning of said reaction ring and said driven rotor with respect to said annular flange, means for introducing hydraulic fluid into said housing to fill the space therein with hydraulic fluid.

2. In a hydraulic transmission, a casing fixed to a prime mover, a housing within said casing and attached to the output means of said prime mover for rotation within said casing, a driving rotor mounted within said housing, an annular flange fixed within said housing and to the outer periphery of said driving rotor, driving vanes slidably retained within said annular flange, a reaction member slidably retained by said casing within one end of said housing, a driven rotor within the other end of said housing, said vanes separating said driven rotor and said reaction member, said driven rotor and said reaction member being axially fixed with relation to each other, pump blades slideably attached to said reaction member, motor blades slideably attached to said driven rotor, means to cause said pump blades and said motor blades to wipe along respective sides of said annular flange and pass around said vanes, cross-over hydraulic fluid channels adjacent said vanes to pass oil from one side of said annular flange to the other side thereof, means for varying the space between said annular flange and said reaction member and between said annular flange and said driven rotor to control the volume of fluid pumped from one side of said flange to the other side of said flange, an output shaft fixed to said driven rotor and passing through said housing and said casing, said housing and said driving rotor being rotatable to drive said vanes to transfer hydraulic fluid from one side to the other side of said flange and said driven rotor being responsive thereto to be driven in either direction with respect to said casing.

3. A transmission including a rotatable housing, means for rotating said housing, a partition within said housing separating said housing into an expansible pump compartment and an expansible motor compartment, said housing having fluid passageways between said pump compartment and said motor compartment, said partition forming one wall of each of said compartments, a vane mounted for rotation with said housing and extending into said pump compartment and said motor compartment, a fixed member in said housing defining the other wall of said pump compartment, pump blades mounted in said fixed member and extending into said pump compartment and cooperating with said partition and said vane for delivering fluid under pressure to said motor compartment, a rotor member in said housing defining the other wall of said motor compartment, and rotor blades mounted in said rotor member and extending into said motor compartment and cooperating with said partition and said vane for rotating said rotor member by the fluid from said pump compartment.

4. A transmission including a rotatable housing, means for rotating said housing, a partition within said housing separating said housing into an expansible pump compartment and an expansible motor compartment, said housing having fluid passageways between said pump compartment and said motor compartment, said partition forming one wall of each of said compartments, a vane mounted for rotation with said housing and extending into said pump compartment and said motor compartment, a fixed member in said housing defining the other wall of said pump compartment, pump blades mounted in said fixed member and extending into said pump compartment and cooperating with said partition and said vane for delivering fluid under pressure to said motor compartment, a rotor member in said housing defining the other wall of said motor compartment, rotor blades mounted in said rotor member and extending into said motor compartment and cooperating with said partition and said vane for rotating said rotor member by the fluid from said pump compartment, an output shaft rotatable by said rotor member, and means for axially moving said pump blades and said rotor blades as an incident to relative movement of said vane with respect thereto to permit said vane to pass said blades.

5. A transmission including a rotatable housing, means for rotating said housing, a partition within said housing separating said housing into an expansible pump compartment and an expansible motor compartment, said housing having fluid passageways between said pump compartment and said motor compartment, said partition forming one wall of each of said compartments, a vane mounted for rotation with said housing and extending into said pump compartment and said motor compartment, a fixed member in said housing defining the other wall of said pump compartment, pump blades mounted in said fixed member and extending into said pump compartment and cooperating with said partition and said vane for delivering fluid under pressure to said motor compartment, a rotor member in said housing defining the other wall of said motor compartment, rotor blades mounted in said rotor member and extending into said motor compartment and cooperating with said partition and said vane for rotating said rotor member by the fluid from said pump compartment, an output shaft rotatable by said rotor member, and means for simultaneously and inversely altering the relative volume of said pump and motor compartments to alter the responsive speed of rotation of said rotor member with respect to the speed of rotation of said housing. with respect to the speed of rotation of said housing.

6. A transmission including a rotatable housing, means for rotating said housing, a partition within said housing separating said housing into an expansible pump compartment and an expansible motor compartment, said partition forming one wall of each of said compartments, vanes mounted for rotation with said housing and extending into said pump compartment and said motor compartment, a rotationally-fixed axially-slidable member in said housing defining the other wall of said pump compartment, pump blades mounted in said rotationally-fixed member and extending into said pump compartment and cooperating with said partition and said vanes for delivering fluid under pressure to said motor compartment, a rotatably and axially slidable rotor member in said housing defining the other wall of said motor compartment, rotor blades mounted in said rotor member and extending into said motor compartment and cooperating with said partition and said vanes for rotating said rotor member by the fluid from said pump compartment, an output shaft rotatable with rotor member, and means for exchanging fluid between said motor compartment and said pump compartment.

7. A transmission including a rotatable housing, means for rotating said housing, a partition within said housing separating said housing into an expansible pump compartment and an expansible motor compartment, said housing having fluid passageways between said pump compartment and said motor compartment, said partition forming one wall of each of said compartments, vanes mounted for rotation with said housing and extending into said pump compartment and said motor compartment, a rotatably-fixed axially-slidable member in said housing defining the other wall of said pump compartment, pump blades mounted in said rotatably-fixed member and extending into said pump compartment and co-operating with said partition and said vanes for delivering fluid under pressure to said motor compartment, a rotatable and axially slidable rotor member in said housing defining the other wall of said motor compartment, rotor blades mounted in said rotor member and extending into said motor compartment and cooperating with said partition and said vanes for rotating said rotor member by the fluid from said pump compartment, and means for simultaneously moving said rotatably-fixed member and said rotor member axially of said pump and motor compartments respectively to inversely alter their relative volumes to alter the responsive speed of rotation of said rotor member with respect to the speed of rotation of said housing.

8. A transmission including a rotatable housing, means for rotating said housing, a partition within said housing separating said housing into an expansible pump compartment and an expansible motor compartment, said housing having fluid passageways between said pump compartment and said motor compartment, said partition forming one wall of each of said compartments, vanes mounted for rotation with said housing and extending into said pump compartment and said motor compartment, a rotatably-fixed axially-slidable member in said housing defining the other wall of said pump compartment, pump blades mounted in said rotatably-fixed member and extending into said pump compartment and cooperating with said partition and said vanes for delivering fluid under pressure to said motor compartment, a rotatable and axially slidable rotor member in said housing defining the other wall of said motor compartment, rotor blades mounted in said rotor member and extending into said motor compartment and cooperating with said partition and said vanes for rotating said rotor member by the fluid from said pump compartment, means for simultaneously moving said rotatably fixed member and said rotor member axially of said pump and motor compartments respectively to inversely alter their relative volumes to alter the responsive speed of rotation of said rotor member with respect to the speed of rotation of said housing, and means for sliding said blades axially as an incident to relative movement of said vanes to permit said vanes to pass said blades.

9. A transmission including a rotatable housing, means for rotating said housing, a partition within said housing separating said housing into an expansible pump compartment and an expansible motor compartment, said housing having fluid passageways between said pump compartment and said motor compartment, said partition forming one wall of each of said compartments, a vane slidably mounted through said partition to be rotated therewith and extending into said pump compartment and said motor compartment, a rotatably-fixed axially-slidable slotted member in said housing defining the other wall of said pump compartment, pump blades mounted in the slots of said rotatably-fixed member and extending into said pump compartment and cooperating with said partition and said vane for delivering fluid under pressure to said motor compartment, a rotatable and axially-slidable axially-slotted rotor member in said housing defining the other wall of said motor compartment, rotor blades mounted in the slots of said rotor member and extending into said motor compartment and cooperating with said partition and said vane for rotating said rotor member by the fluid from said pump compartment, means for simultaneously moving said rotatably-fixed member and said rotor member axially of said pump and motor compartments respectively to inversely alter their relative volumes to alter the responsive speed of rotation of said rotor member with respect to the speed of rotation of said housing.

10. A transmission including a rotatable housing, means for rotating said housing, a central peripheral partition within said housing separating said housing into an expansible pump compartment and an expansible motor compartment, said housing having a pair of fluid cross-over passageways between said pump compartment and said motor compartment for the simultaneous flow of fluid between said compartments, said partition forming one wall of each of said compartments, a vane slidably mounted through said partition to be rotated therewith and extending into said pump compartment and said motor compartment, one of said pasasgeways leading from one side of said vane in one compartment to the other side of said vane in the other compartment, the other of said passageways leading from said other side of said one compartment to said one side of said vane in said other compartment, a rotatably-fixed axially-slidable slotted member in said housing defining the other wall of said pump compartment, pump blades mounted in the slots of said rotatably-fixed member and extending into said pump compartment and cooperating with said partition and said vane for delivering fluid under pressure to said motor compartment, a rotatable and axially-slidable slotted rotor member in said housing defining the other wall of said motor compartment, rotor blades mounted in the slots of said rotor member and extending into said motor compartment and cooperating with said partition and said vane for rotating said rotor member by the fluid from said pump compartment, and means for simultaneously moving said rotatably-fixed member and said rotor member axially of said pump and motor compartments respectively to inversely alter their relative volumes to alter the responsive speed of rotation of said rotor member with respect to the speed of rotation of said housing.

References Cited in the file of this patent

UNITED STATES PATENTS

| | | |
|---|---|---|
| 1,954,793 | Averin | Apr. 17, 1934 |
| 2,701,948 | Iavelli et al. | Feb. 15, 1955 |

FOREIGN PATENTS

| | | |
|---|---|---|
| 405,823 | Great Britain | Feb. 15, 1934 |